United States Patent [19]

Ahamed

[11] Patent Number: 5,465,319
[45] Date of Patent: Nov. 7, 1995

[54] ARCHITECTURE FOR A COMPUTER SYSTEM USED FOR PROCESSING KNOWLEDGE

[75] Inventor: Syed V. Ahamed, Somerset, N.J.

[73] Assignee: AT&T Corp., Murray Hill, N.J.

[21] Appl. No.: 318,582

[22] Filed: Oct. 5, 1994

Related U.S. Application Data

[63] Continuation of Ser. No. 146,248, Nov. 2, 1993, abandoned.

[51] Int. Cl.$^6$ .................................................. G06F 9/44
[52] U.S. Cl. ........................... 395/11; 395/54; 395/62; 395/76
[58] Field of Search ........................... 395/11, 51, 56, 395/600, 54, 64, 76

[56] References Cited

U.S. PATENT DOCUMENTS

| | | | |
|---|---|---|---|
| 4,868,763 | 9/1989 | Masui et al. | 395/11 |
| 4,999,833 | 3/1971 | Lee | 395/11 |

OTHER PUBLICATIONS

Improving Operation and Maintenance for Switching Network T. Miyazaki et al. 27–30 Nov. 1989 IEEE Conf.
SVEX: Switching Program Verification Expert System Jun–Ichi Yamazaki et al. 16–19 Apr. 1990 IEEE Conf.

*Primary Examiner*—Allen R. MacDonald
*Assistant Examiner*—Richemond Dorvil

[57] ABSTRACT

The present invention is a knowledge machine method and apparatus for processing information and evolving knowledge. The apparatus includes at least one processor; a knowledge machine including a main memory operatively connected to the processor(s), and a plurality of knowledge machine hardware modules at least indirectly connected to the main memory. The modules include a communication module, a switching module, an administrative module and at least one knowledge base module. There is also hardware, firmware and software in the knowledge machine hardware modules to enable the modules to perform at least the following functions: for the communication module, to control all functional processes of the other modules, the main memory and the processor(s); for the switching module, to select and switch between selected information; for the administrative module, to perform housekeeping functions, including multitasking control with resource allocation, real-time multitasking and scheduling of tasks; for the knowledge base module(s), to operate knowledge processing functions and to store knowledge data banks. In some preferred embodiments, the knowledge processing functions of the knowledge base module may be logical, inductive, associative, inferential and deductive reasoning type functions.

20 Claims, 2 Drawing Sheets

ARCHITECTURE FOR A COMPUTER SYSTEM USED FOR PROCESSING KNOWLEDGE

This application is a continuation of application Ser. No. 08/146,248, filed on Nov. 2, 1993, now abandoned.

BACKGROUND OF THE INVENTION

1. Field of the Invention

The present invention relates to architecture for a knowledge machine and more specifically to a knowledge machine method and apparatus. Unlike data processing of conventional computer systems and unlike call processing switching systems, the present invention knowledge machine method and apparatus is a significant improvement over modern electronic switching systems and includes modifications to the communication, switching and administrative modules as well as the addition of one or more knowledge modules.

2. Information Disclosure Statement

In conventional processing of data, the central processing unit plays the dominant role in executing the binary instructions in a pre-defined programmed sequence. Data availability and access is made feasible by the linking and loading functions. The processes involved in installing executable binary codes into the computer in usable form, are compiling, assembling and linking as well as the actual loading of the program and of the data into the core storage area of the computer. One process generally (and conveniently) forgotten by the computer scientists is the higher level language programming of a problem that is to be solved. Assuming no errors in these processes, the machine sequentially executes these instructions and brings the program to a normal termination and provides the user with the results that were being sought by the user without attention to the language of the program(s) in and loaded into the computer.

In telecommunication networks with electronic switching, the switching system or systems plays the dominant role in executing the various steps that are necessary for call processing. The sequence of the steps necessary for the completion of call processing is much more varied than the sequence of instructions for data processing. The switching systems may be distributed and the cooperative role of the various switching systems may become essential. This aspect is not unlike the controlled distribution of the processing in multiprocessor/multicomputer systems. Fortunately, with the evolution of the common channel interoffice signalling system and the standardization of its protocol, distributed call processing is not a problem in most modern communication networks. It is interesting to note that the level of programming in the switching systems is at higher level than the programming level of the third generation programming languages. This jump leaves the programmers of the switching systems with the more mundane functions of generating the executable code for the normal three modules (communication, switching, and administrative) of the switching system.

In modern "intelligent" networks (such is used by the Assignee herein, American Telephone and Telegraph Company, as well as other Universal Intelligent Networks), the service provisioning of the special services becomes the cooperative role of at least five well known interdependent computerized systems. These interdependent computerized systems are the service switching points, the service transfer points, the service control points, the service creation environment and intelligent peripherals.

Some of these known systems are substantially modified and/or supplemented in the present invention to create a knowledge machine environment. These significant charges are neither taught nor rendered obvious by the prior art.

SUMMARY OF THE INVENTION

The present invention is a knowledge machine method and apparatus for processing information and evolving knowledge. The apparatus includes at least one processor; a knowledge machine including a main memory operatively connected to the processor(s), and a plurality of knowledge machine hardware modules at least indirectly connected to the main memory. The modules include a communication module, a switching module, an administrative module and at least one knowledge base module. There is also hardware, firmware and software in the knowledge machine hardware modules to enable the modules to perform at least the following functions: for the communication module, to control all functional processes of the other modules, the main memory and the processor(s); for the switching module, to select and switch between selected information; for the administrative module, to perform housekeeping functions, including multitasking control with resource allocation, real-time multitasking and scheduling of tasks; for the knowledge base module(s), to operate knowledge processing functions and to store knowledge data banks. In some preferred embodiments, the knowledge processing functions of the knowledge base module may be logical, inductive, associative, inferential and deductive reasoning type functions.

BRIEF DESCRIPTION OF THE DRAWINGS

The present invention is more fully understood when the specification herein is taken in conjunction with the drawings appended hereto, wherein.

BRIEF DESCRIPTION OF THE INVENTION

Figure 1:
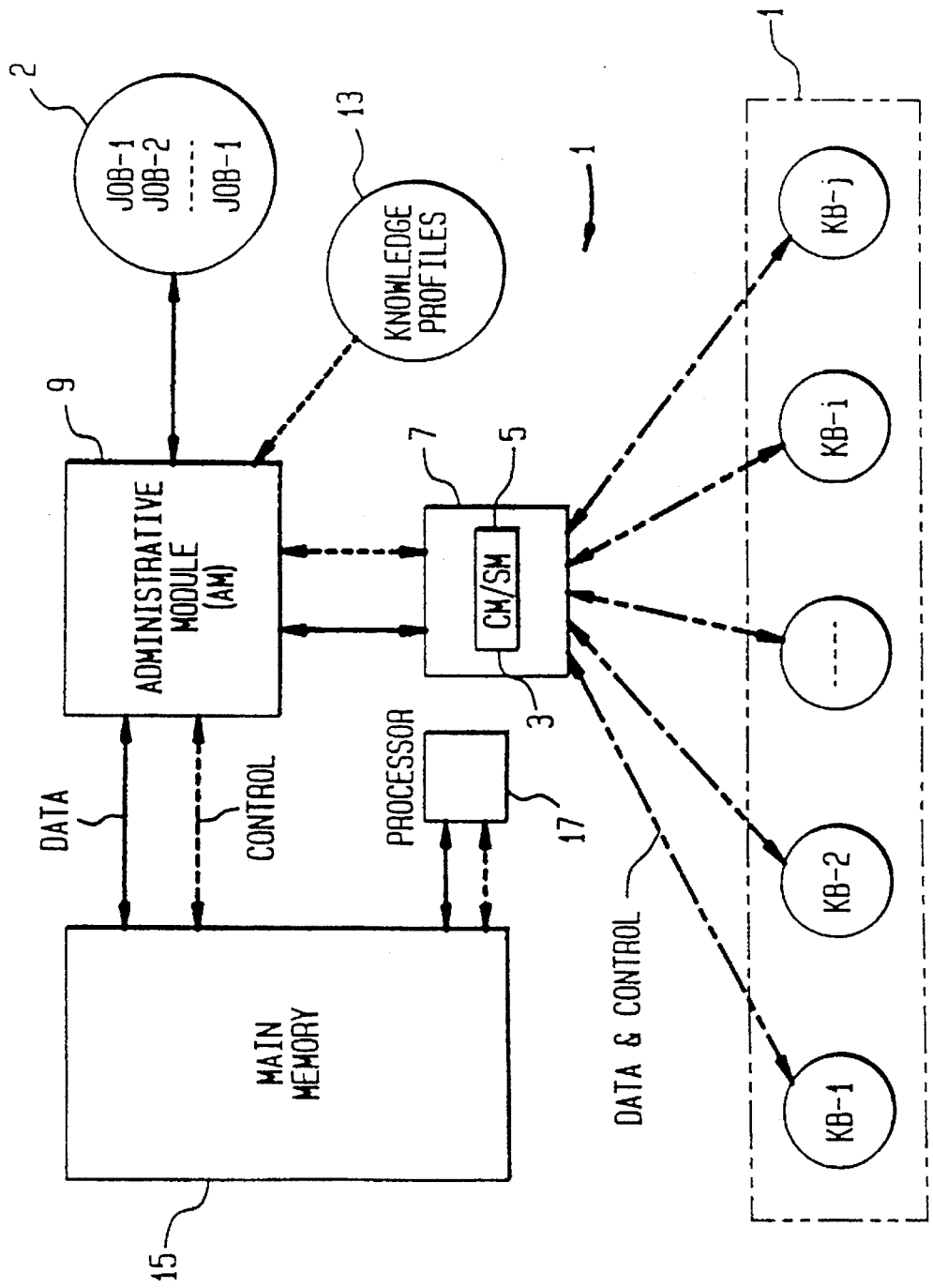
FIG. 1 illustrates a schematic diagram of a present invention knowledge machine apparatus using a single processor; and, FIG. 2 illustrates one embodiment of a present invention knowledge machine apparatus with a plurality of processors, switching modules and knowledge base modules.

The present invention knowledge machine relates to computer systems, to call processing and to intelligent networks, and to advances beyond these systems for the processing and evolution of knowledge.

The present invention knowledge machine method and apparatus relates to certain aspects of modern "intelligent" networks known as service processing. Specifically, the present invention relates to the five interdependent computerized systems for the service provisioning of special services of intelligent networks.

First, consider the service switching points. These are modern switching systems with added capability to recognize the service trigger condition such as 800, 911, 700, etc., numbers. The functionality of the service switching points may not be affected and is not crucial to the operation of the present invention knowledge machine method and apparatus.

Second, consider the service transfer points. These act as relay points accepting packetized information to and from service switching points, and service control points. The functionality of the service transfer points is not crucial to the operation of the present invention knowledge machine method and apparatus, even though the exchange of information between the various modules of the knowledge machine need well designed format and protocol.

Third, consider service control points. These are extensive data bases with well managed, replaceable and updatable information, to make the queried information available to the service switching point in a completion of a service or a service process that the service switching point is performing at that instant of time as the provisioning of the service progresses.

In the present invention knowledge machine environment, the storage of updatable information that acts as quick reference to the various categories of subjects and the type of derived information about these subjects becomes necessary. The databases in the service control point becomes equivalent to a "knowledge profile" for the information contained in the present invention knowledge module(s).

Fourth, consider the service creation environment. This facility provides service vendors with a programming and debugging environment to try out new service concepts or ideas. In this environment, new services may be "programmed" into the network by "assembling" a new service as a program of various well defined functional module(s). These modules correspond to the macros or routines in the conventional computer environments. In a sense, the programming of services in these service oriented networks is like assembly level programming of an engineering problem. The functional modules provide the bridge for service providers to perform valid network subfunctions consistent with the service they are providing. Such service logic programs are usually interpreted by a service logic interpreter which may be housed in a service switching point, service control point or an intelligent peripheral (see the next component) and act in conjunction with local network information databases. Hence, the new software interface can be tailored for these types of networks.

In the present invention knowledge machine environment, the service creation environment plays a finite role. Consider the situation when a new inference machine becomes available from the knowledge engineers. The data for deriving the new inferences can be resident in the knowledge module(s), but the newer implications (obtained from the new inference engine) may not be available to the users unless a group of applications engineers decide to program the new inference engine in the present invention knowledge machine. For this reason, the service creation environment equivalent in the present invention knowledge machine is seen as an environment which provides new inferences from old knowledge or generates new inferences from old data.

Finally, consider the intelligent peripherals. These computerized devices may exist as a network node with modern signalling system connectivity to a service switching point via their own trunk lines or have an integrated services digital network primary rate capability. In many cases, the intelligent peripheral may be only bridged to the communication channel for the duration of the call. It is expected that the intelligent peripherals of the future will provide a great variety of services. By being programmable, many services may be provided by this device.

In the present invention knowledge machine environment, small variations of the response from the knowledge machine may be altered to be customized to the group user needs. For example, a group of pharmaceutical students may be interested in the clinical properties of certain plants whereas a group of botany students may be interested in the habitat and climatic conditions. The intelligent peripheral equivalent thus becomes instrumental in providing the knowledge service back to the user in a fashion, style and format exactly tailored to the user's needs.

I. Platform of the Knowledge Machine

The existing systems and elements in the previous section are designed to perform specific tasks germane to the system (computer, telecommunication, or intelligent networks). None of these three systems perform functions specialized to processing of knowledge and knowledge engineering. The most flexible hardware and software architecture deployed in the switching system may, however, be modified to incorporate functions germane to the processing of information and evolution of knowledge by logic and reason. In this section, we propose four major building blocks for the knowledge machine with each one being a programmable system.

1.1 Communication Module of the Knowledge Machine

First, consider the communication function in context to the knowledge machine. The capacity to control the communication between all the processes as they relate to one function upon one piece of information is not unlike the concentration of the human mind in the solution of one problem at one time. Even though numerous problems are solved simultaneously in the knowledge machine, the communication between the knowledge module(s) or subareas of knowledge within one or more knowledge modules and the subprocess (or tasks within that process) as they pertain to a specific problem and to systematically organize the inputs and outputs of the discrete processes becomes a necessary function of the communication module in the knowledge machine. Further, consider the collation or the assembling of the processes in the solution of any problem. No standard language or compiler exists to verify the validity or the relevance of the problem in context of the knowledge bases accessible to the knowledge machine. The syntax is loosely defined and the communication module of the knowledge machine may only assemble processes in view of how much information is stored in the knowledge bases and what is the relation in the hierarchy of this knowledge. Functions of this nature that control and guide the communications germane to the various processes become the task of the communication module.

1.2 Switching Module of the Knowledge Machine

Second, consider the switching module in context to the knowledge machine. The capacity to select and switch between large quantities of information as it becomes relevant to the process of solving a problem is one of the basic traits of a perceptive mind. The perception part is handled by the communication module but the contextual switching is handled by the switching module which permits the access and direct memory access capability between the knowledge bases and the memory executing the process of the problem solving. Further, consider the situation where the local knowledge bases are inadequate but the knowledge machine has access to the other bases on the network, then the function of switching to and from the source of relevant information (wherever it may be) also becomes the function of the switching module of the knowledge machine.

In the electronic switching systems, the switching module functions in a completely duplex mode and any subscriber can be the call-er or the call-ed party. In the knowledge machine environment, the switching function is much more confined. The processes within a task or a problem are standard and more limited to the number of multiple tasks for which the knowledge machine is programmed (in its operating system) to handle. The number of addressable and distinct files in the knowledge module can be enormous. Hence, we see that the switching module may be far less complicated than the corresponding module in the telecommunication environment. In fact, on the communication module side the switch can look like a PBX (private branch exchange with limited number of incoming lines) and on the knowledge module side the switch can look like a hierarchical star. Each branch is encoded with the successive number of Dewey decimal/Library of Congress subject catalogue.

1.3 Administrative Module of the Knowledge Machine

Third, consider the administrative module in context to the knowledge machine. The knowledge machine may be equipped to handle many hundred of problems at the same time and operate as multi-processor, multi-tasked system. The housekeeping functions for operating the knowledge machine is handled by the administrative module. Resource allocation, real-time multi-tasking, and scheduling of the tasks in the processing of knowledge becomes the key function of the administrative module. In many computing systems, the same hardware and the memory is computing systems, the same hardware and memory is partitioned to perform the operating administrative system functions and the computing. However in the knowledge machine, it may be desirable to have the administrative module isolated from the other three modules. This approach is used in telecommunication switching systems to handle the operations, engineering and maintenance functions distinctly from the network and communication functions.

1.4 Knowledge Module(s) of the Knowledge Machine

Finally, consider the knowledge module in context to the knowledge machine. Specifically designed object oriented programming tools and languages are used. These object oriented programming tools process entities and establish relations between them. Forward and backward linkages may thus be established using such object oriented programming tools. Learning machines discover latent causes and various objects can be codified. Inductive, associative, inferential, and deductive reasoning is preferably programmed with fourth generation object oriented programming languages. Since the exact interdependence of this module with the other three modules needs to be optimally configured, a class of knowledge processing functions is grouped and the system (hardware, software and firmware) housed in the knowledge module is charged to handle some of these functions depending upon the processing power within the module. The remaining knowledge functions are handled in the administrative module. The partitioning of these functions depends upon the relative sizes of active memories and processing capabilities of the administrative and the knowledge modules in the knowledge machine.

It appears disadvantageous to expect one basic computer hardware architecture to optimally perform communication, switching, administrative and knowledge functions germane to the entire cross section of problems that a broad-based knowledge machine would be expected to tackle. Partitioning the system in view of its subfunctions leads to preferred architectural arrangements. If the response time from the machine is to be low, then the balance between the administrative, communication, switching and knowledge functions needs to be consistent with the average blend of these functions aspect of balancing the functional requirements with the relative speed and power of the processors, memories, I/O, switches, and buses also exists in the conventional computer architecture.

II. Architecture of the Knowledge Machine

2.1 Single Processor Environments

This configuration (FIG. 1) is presented to illustrate the organization of the knowledge machine with a single processor. From an implementational consideration the configuration (FIG. 2) with multiple processors is more preferred for broad-based knowledge machines.

In the single processor environments as shown by example in FIG. 1, the knowledge machine 1 is operated to perform various jobs 2, utilizing its basic modules and memory. In this example, the communication module 3 and the switching module 5 can be combined into a single hardware unit 7. In one embodiment, it may look like a disk controller which channels the access to certain track-sector addresses when certain subject matters are being pursued. This simplification is feasible because of the reduced requirements placed upon the switching module 5 which provides a communication path during the allocated time interval between the only processor (or memory) in the administrative module 9 accomplishing only one individual knowledge oriented "task" and the knowledge module 11. To some extent the simplifying is comparable to shrinking a 5ESS (more advanced electronic switching system) to one line PBX (private branch exchange). All of the switching takes place on the knowledge module 11 side.

The role of and relationship of the administration module 9 may be as shown in FIG. 1. This unit 9 does the compilation of the steps invoked in the solution of the knowledge oriented problems. It is also foreseen that the steps invoked in the solution of intricate problems will depend upon the result of the prior steps and an "compile-as-you-go" approach is necessary. But this approach is practiced well by communication engineers in the implementation of network algorithms (e.g. path routing, use dependent path assignment, fault tolerance, etc.) and may become necessary for the design of the software for this environment.

In addition, this administrative module unit 11 has the support of a disk resident "knowledge profile" 13, which profiles the knowledge module 11. In essence, the profile 13 provides an initial check point when the users invoke operations pertaining to the knowledge stored in the knowledge module(s) 11. It is somewhat similar to the card-file index that the older libraries used to maintain in order to facilitate the users to find the exact address and the text book which contains the subject matter they are pursuing. It also verifies that the users ask questions of the system that are consistent with the knowledge contained therein. For example it identifies what action (like what, how, when, where, what-if, how-where, what-when, combinations, etc.; analogize, predict, similarize, combinations, etc.;) may be applicable to what subject matter (like polymers, petrochemicals, Maxwell's equations, satellite systems, etc.,). In a simplistic case where the knowledge machine 1 is geared towards high school teaching, the profile 13 can be pre-shrunk from the more elaborate profile of the machine oriented to a graduate research center where the subject matters are processed. This customizing of the disk resident profile 13 is similar to the editing of the table of contents for text books covering the same subject for school use or college use. From the perspective of the computer software designers, this customizing is similar to the selection of different compilers for different hardware modules (e.g., co-processors, array processors, A to D converters, etc.) or software (e.g., trigonometric, hyperbolic, exponential, etc.) library routines.

The administrative module 9 may also be invoked to modify and manage the knowledge banks (a function similar to the function of the service management systems in intelligent networks) and the corresponding updating of the knowledge profile 11. Additional security checks of the access and updating of users and their use of the knowledge modules 11 may also be incorporated here.

The compiler and executable task oriented program may also be made a disk resident in the administrative module 9 or handled in the main memory 15 of the system. (This main memory 15 may be viewed as part of the administrative module 9 or as part of a processor 17 which enables the user to operate basic functions, or as a separate hardware main memory). These routine housekeeping functions are also handled by the administrative module 9 either directly or through the processor 17 by control of the processor 17, or both.

2.2 Multiprocessor Based Environments

Figure 2:
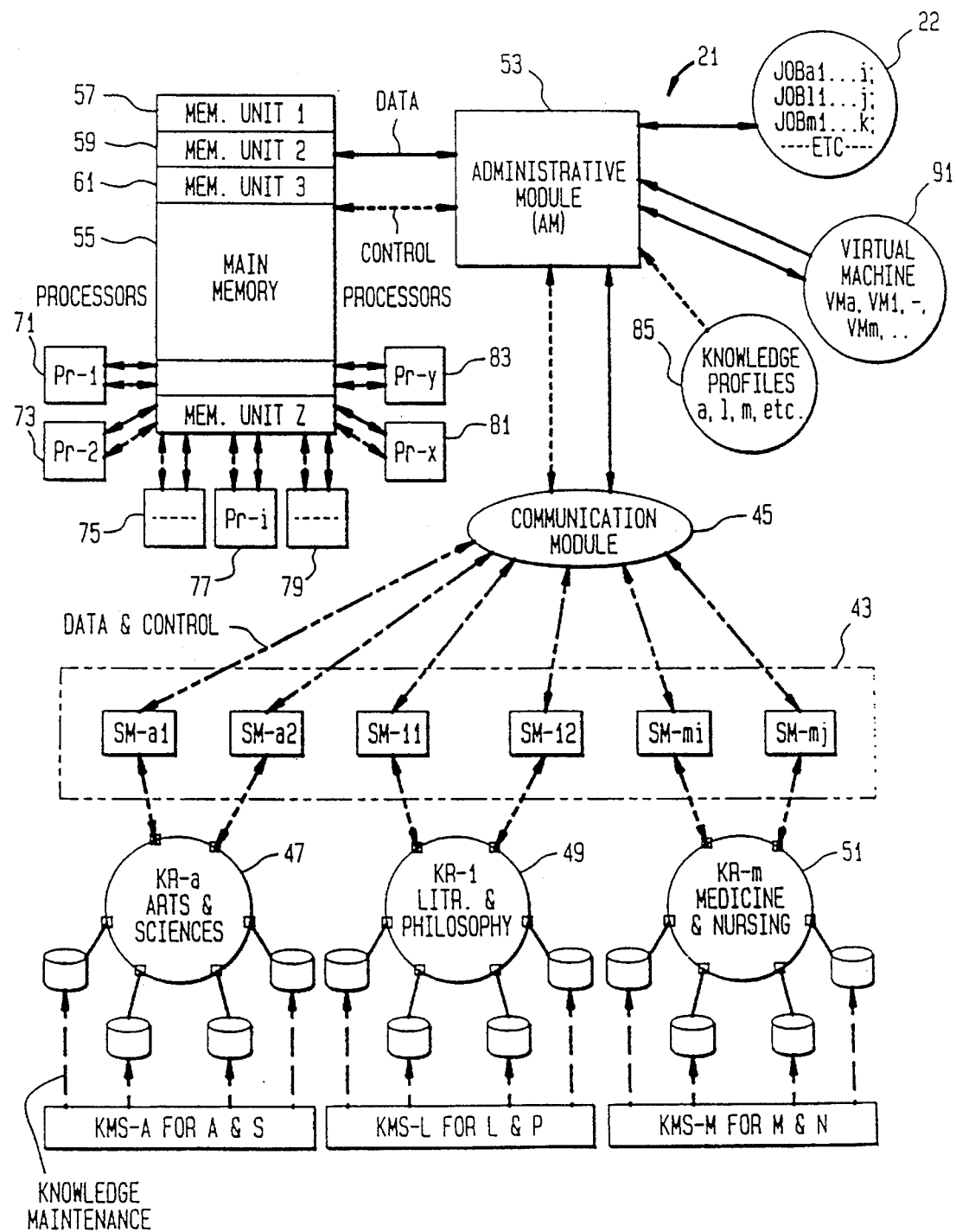

FIG. 2 depicts a multiprocessor knowledge machine 21 with four basic modules of the knowledge machine and one way of interconnecting the components. In this arrangement, the switching module set 43 (shown with six exemplary switching modules) is between the communication module 45 and the knowledge banks 47, 49 and 51. If the various knowledge banks 47,49 and 51 are arranged in some well defined hierarchical format (such as the Dewey decimal scheme, the Library of Congress classification, etc.), then a network configuration (star, bus, ring, dropped bus, etc.) can be used to retain the access methodology in and out of vast databases. Under these conditions, one BISDN (Broadband Integrated Services Digital Network) link or one access point may be provided between the switching module 43 and the "knowledge network" represented by sample knowledge base module banks 47, 49 and 51 depicted in FIG. 2 as knowledge rings.

The administrative module 53 dynamically with its resident operating system allocates resources, monitors the performance, and prevents dead-locks. The operating and accounting functions of the knowledge machine 21 are contained within the administrative module 53. The engineering and maintenance functions (such as updating of the knowledge banks, altering the structure and hierarchy of the stored information in the knowledge banks, modifying the compiling and interpreting processes of the communication module 45 for its many tasks, etc.) are also performed by administrative module 53.

The administrative module 53 is also responsible for the execution of each subprocess in a problem solution or query handling, i.e. job 22, by the knowledge machine 21. In a sense, it becomes the hardware host for the knowledge machine 21 "operating system". It is foreseen that, in preferred embodiments, that the administrative module 53 is a parallel processor system, if the knowledge machine 21 is going to be shared between a large number of user tasks. Since any processor 71, 73, 75, 77, 79, 81 and 83 (in the administrative module) can access any information in the knowledge base modules 47, 49 and 51, the switching module set 43 switches between the processors 71 through 83 of the administrative module 53 and the read/write capability of the knowledge banks of the knowledge base modules 47, 49 and 51. The quantity of information and its directionality may now be identified. In the great majority of the cases, the knowledge banks share large chunks of information with the memory units, such as units 57, 59 and 61 of the administrative module 53. After performing the knowledge functions (pattern recognition, matching, forward/backward pointing, interference drawing, storing in appropriate knowledge banks, etc.,) the contents of the main memory 55 may be discarded. Whereas the interrogation may be only one instruction long, the returned information can be a large block. Thus, the modality of communication between the administrative module and the knowledge banks can be made asymmetrical and for this reason serial query port and direct memory access for burst-back is a desirable and feasible implementation. The switching module may also be designed for the low/high rates of data movement.

In the traditional sense for the electronic switching systems, the switching module is typically located between the trunk (and subscriber links) from one geographic area to the next. In the knowledge machine, the switching module accesses the various processors (and memory modules) in the administrative module and the extensive fragments of knowledge in the knowledge banks. The addressing in the knowledge machine is done by the classification of knowledge and its hierarchy. In the traditional sense, the addressing is done via the area codes, and exchange numbers. The address translation and seek time is dramatically reduced by the addressing of the subject material on which the knowledge function is being performed by its decimal code. The same code thus provides the exact address of that specific piece of knowledge in the knowledge banks.

III. Performance and Bottlenecks in the Architecture

It should be noted that the bus capacity and memory allocation algorithms may affect the performance of various configurations and intended uses. Since the amount of information necessary to perform knowledge functions can be vastly different depending upon the topic and the type of operation, fixed memory allocation algorithms are particularly useful. In some preferred embodiments, however, the operating system has sufficient flexibility (such as dynamic memory allocation), the active memory size is made sufficient to handle complex knowledge machine functions (such as pattern recognize, crosscompare, find analogies, find supplementary knowledge, scan other sciences etc.), and the switching module provides access between all the administrative module processors and the file segments in the knowledge banks in real time.

Some bottlenecks may occur in this methodology when all of the users need or access the same information, or use the same memory intensive subprocesses, e.g., a class of students handling the solution to a given problem during the laboratory hour. Queue management techniques still leads to long response times. Thus, these can be minimized or avoided by cloning selected knowledge banks, by parallel computing enhancements and by faster hardware.

IV. Alternate Architectures

The amount of storage and the extent of processing in the knowledge banks is negotiable. All storage and no processing leads to massive transfers of data from the knowledge banks to the memory modules of the administrative module and the processor of the administrative module performs all of the knowledge oriented functions. Evidently enough, no storage in the knowledge banks eliminates the need for knowledge banks and switching modules. However, as a compromise, with some processing in the knowledge banks rudimentary knowledge functions may be accomplished and only relevant information may be forwarded to the administrative module, thus reducing the channel access time and wait time. The intelligent networks have solved this problem partially by having some processing in the service control point. Achievement of such a balance is by far more readily available in the knowledge machine based on careful selections of subprocesses as the object oriented programming tools described above (fourth generation object based) and the knowledge data.

The resolution and accuracy of the knowledge profile is also subject of optimal design of the knowledge machine. At one extreme, with perfect granularity in the knowledge profile the compile time of the problem is longer but the users obtain an exact response from the knowledge banks. On the other hand, incomplete or imperfect representation of the knowledge banks in the profile will prevent legitimate use of the knowledge banks or execution time errors from the knowledge banks. However, the balance of detail versus execution time may be tailored to the needs for detail versus time for particular user groups and these choices are well within the purview of the artisan.

This application has set forth a framework of the knowledge machine method and apparatus. Two possible specific configurations of the knowledge processing environments are presented with many alternatives discussed. Functionally, these machines are only slightly more sophisticated than known data processing environments. Numerous clusters of conventional machines under the control of a central administrative module of a present invention knowledge machine apparatus may process knowledge effectively, much like the electronic switching systems of the telecommunications industry. In view of the immense amount of knowledge in any branch of science, multiplicity of the knowledge machines in a network can be used with each dedicated to a particular discipline. Further, the logical and the low level human functions (including all programmable processing of fragments of knowledge) can be mechanized in this environment. Knowledge refurbishing and maintenance can also be programmed by the administrative module. Adequate and authorized sources of new information (such as research laboratories, literature, meteorological observations centers, etc.) also need to be connected to the switching modules to incorporate the "new" information onto the knowledge bases. These ongoing "growth" functions, coupled with various knowledge subprocesses, including intuitive, inferential and logical processing, will result in evolving knowledge machines.

Obviously, numerous modifications and variations of the present invention are possible in light of the above teachings. It is therefore understood that within the scope of the appended claims, the invention may be practiced otherwise than as specifically described herein.

What is claimed is:

1. An architecture for a computer system used for processing knowledge, said architecture comprises:
   a. a processor;
   b. a memory connected to said processor; and
   c. a plurality of modules for performing functions for processing knowledge, each function relates to a particular inquiry and involves specific subprocesses, wherein each module is a programmable system of a certain processing power and contains hardware, firmware and software, each module accepts inputs and generate outputs in the processing of said subprocesses, and the plurality of modules include:
      i. a knowledge module for storing knowledge in at least one knowledge bank containing data organized in a knowledge hierarchy, and for processing said subprocesses using knowledge functions, wherein said knowledge hierarchy provides links between said data thereby forming a knowledge network, and wherein said knowledge functions are implemented by object oriented tools for establishing relationships between the data in the at least one knowledge bank and for generating the outputs from the established relationships, said knowledge functions being selected from the group consisting of logical, inductive, associative, inferential, and deductive reasoning type functions, and combinations thereof;
      ii. a communication module for communicating between said knowledge module and other modules processing said subprocesses, and for organizing said inputs and said outputs of said subprocesses, and for controlling and guiding each subprocess to a specific knowledge bank by organizing said subprocesses according to said data and said knowledge hierarchy of said knowledge module;
      iii. an administrative module for performing housekeeping functions involving resource allocation, real-time multitasking and scheduling of said subprocesses, and for providing hardware to said knowledge module to execute the subprocesses; and
      iv. a switching module for selecting and switching between said knowledge bank and said administrative module according to said communication module.

2. The architecture of claim 1 wherein said administrative module controls said processor to balance the functioning among said modules according to said processing power of each module such that response time of the computer system is minimized.

3. The architecture of claim 1 wherein said administrative module controls said knowledge module such that said knowledge module performs a portion of said knowledge functions depending upon said knowledge module's processing power, the remaining knowledge functions are performed by said administrative module.

4. The architecture of claim 1 wherein said administrative module is integrated with said processor and said memory.

5. The architecture of claim 1 wherein said object oriented tools are implemented in software generated from fourth generation object oriented programming languages and are stored in said memory.

6. The architecture of claim 1 wherein said processor comprises a single processor.

7. The architecture of claim 6 wherein said communication module and said switching module are integrated into a hardware unit.

8. The architecture of claim 7 wherein said hardware unit comprises a disk controller.

9. The architecture of claim 1 wherein said communication module organizes said subprocesses in a perceptive manner to control and guide said subprocesses for solving an inputted knowledge oriented problem.

10. The architecture of claim 1 wherein said administrative module performs housekeeping functions using a "compile-as-you-go" algorithm stored in said memory to progressively process said subprocesses and to generate and integrate partial results of a dynamic search process to generate, modify, amend, and enhance a final result; and said communication module outputs the final result to a user.

11. The architecture of claim 1 wherein said administrative module comprises a knowledge profile for providing a user with an index of knowledge stored in said knowledge module.

12. The architecture of claim 11 wherein said knowledge profile verifies that a user presents an inquiry consist with the knowledge stored in said knowledge module.

13. The architecture of claim 1 wherein said processor comprises a multiplicity of processors.

14. The architecture of claim 13 wherein said switching module is between said knowledge module and said communication module.

15. The architecture of claim 1 wherein said data is organized and stored in said memory in said knowledge hierarchy in a format selected from the group consisting of the Dewey Decimal System and the Library of Congress classification format.

16. The architecture of claim 1 wherein said knowledge network is configured in a network selected from the group consisting of a star, a ring, a bus and a dropped bus.

17. The architecture of claim 1 wherein said administrative module performs engineering functions and maintenance functions including updating said knowledge banks and altering said knowledge hierarchy in said knowledge module and modifying the method in which said communication module organizes said inputs and said outputs from said subprocesses.

18. The architecture of claim 1 wherein said administrative module and said knowledge module communicate asymmetrically.

19. The architecture of claim 1 wherein said switching module comprises a plurality of switching modules, wherein at least one switching module corresponds to an individual knowledge module.

20. The architecture of claim 1 wherein said knowledge module only outputs information to said administrative module for use by said administrative module to execute subprocesses to perform said knowledge functions.

* * * * *